(12) United States Patent
Kopp et al.

(10) Patent No.: US 9,983,362 B2
(45) Date of Patent: May 29, 2018

(54) HIGH DENSITY OPTICAL PACKAGING HEADER APPARATUS

(71) Applicant: Chiral Photonics, Inc., Pine Brook, NJ (US)

(72) Inventors: Victor Il'ich Kopp, Fair Lawn, NJ (US); Jonathan Singer, New Hope, PA (US); Daniel Neugroschl, Suffern, NY (US)

(73) Assignee: Chiral Photonics, Inc., Pine Brook, NJ (US)

( * ) Notice: Subject to any disclaimer, the term of this patent is extended or adjusted under 35 U.S.C. 154(b) by 0 days. days.

(21) Appl. No.: 15/612,337

(22) Filed: Jun. 2, 2017

(65) Prior Publication Data

US 2017/0336570 A1    Nov. 23, 2017

Related U.S. Application Data

(63) Continuation of application No. 13/442,175, filed on Apr. 9, 2012, now abandoned.

(60) Provisional application No. 61/433,852, filed on Apr. 8, 2011.

(51) Int. Cl.
*G02B 6/36* (2006.01)
*G02B 6/42* (2006.01)

(52) U.S. Cl.
CPC .......... *G02B 6/3668* (2013.01); *G02B 6/3636* (2013.01); *G02B 6/3644* (2013.01); *G02B 6/4214* (2013.01)

(58) Field of Classification Search
CPC .................................................. G02B 6/3668
See application file for complete search history.

(56) References Cited

U.S. PATENT DOCUMENTS

| | | |
|---|---|---|
| 6,396,859 B1 | 5/2002 | Kopp et al. |
| 6,404,789 B1 | 6/2002 | Kopp et al. |
| 6,411,635 B1 | 6/2002 | Kopp et al. |
| 6,671,293 B2 | 12/2003 | Kopp et al. |
| 6,678,297 B2 | 1/2004 | Kopp et al. |
| 6,721,469 B2 | 4/2004 | Kopp et al. |
| 6,741,631 B2 | 5/2004 | Kopp et al. |
| 6,744,943 B2 | 6/2004 | Kopp et al. |
| 6,792,169 B2 | 9/2004 | Kopp et al. |
| 6,839,486 B2 | 1/2005 | Kopp et al. |

(Continued)

FOREIGN PATENT DOCUMENTS

| | | |
|---|---|---|
| WO | WO 2002/073247 A2 | 9/2002 |
| WO | WO 2006/046947 A2 | 5/2006 |

(Continued)

*Primary Examiner* — Jerry Rahll
(74) *Attorney, Agent, or Firm* — Knobbe, Martens, Olson & Bear LLP

(57) ABSTRACT

The inventive high density optical packaging header apparatus, in various embodiments thereof, provides configurable, modular, and highly versatile solutions for simultaneously connecting multiple optical fibers/waveguides to optical-fiber-based electronic systems, components, and devices, and is readily usable in a variety of applications involving highly flexible and modular connection of multiple optical fibers/waveguides assembled in a header block configuration to optical-fiber-based system/component backplanes, while providing advantageous active and passive alignment features.

10 Claims, 4 Drawing Sheets

(56) References Cited

U.S. PATENT DOCUMENTS

| | | | |
|---|---|---|---|
| 6,875,276 B2 | 4/2005 | Shibayev et al. | |
| 6,891,992 B2 | 5/2005 | Kopp et al. | |
| 6,925,230 B2 | 8/2005 | Kopp et al. | |
| 7,009,679 B2 | 3/2006 | Kopp et al. | |
| 7,095,911 B2 | 8/2006 | Kopp et al. | |
| 7,142,280 B2 | 11/2006 | Kopp et al. | |
| 7,242,702 B2 | 7/2007 | Kopp et al. | |
| 7,308,173 B2 | 12/2007 | Kopp et al. | |
| 7,463,800 B2 | 12/2008 | Kopp et al. | |
| 7,802,927 B2 * | 9/2010 | Benjamin | G02B 6/25 385/31 |
| 7,983,515 B2 | 7/2011 | Zhang et al. | |
| 8,218,921 B2 | 7/2012 | Kopp et al. | |
| 8,326,099 B2 | 12/2012 | Singer et al. | |
| 8,457,456 B2 | 6/2013 | Kopp et al. | |
| 8,463,094 B2 | 6/2013 | Kopp et al. | |
| 8,712,199 B2 | 4/2014 | Kopp et al. | |
| 8,948,547 B2 | 2/2015 | Kopp | |
| 9,766,407 B2 | 9/2017 | Weiner et al. | |
| 9,810,845 B2 | 11/2017 | Kopp | |
| 9,817,191 B2 | 11/2017 | Kopp et al. | |
| 2002/0003827 A1 | 1/2002 | Genack et al. | |
| 2002/0069676 A1 | 6/2002 | Kopp et al. | |
| 2002/0118710 A1 | 8/2002 | Kopp et al. | |
| 2002/0172461 A1 | 11/2002 | Singer et al. | |
| 2003/0118285 A1 | 6/2003 | Kopp et al. | |
| 2004/0145704 A1 | 7/2004 | Kopp et al. | |
| 2008/0098772 A1 | 5/2008 | Kopp et al. | |
| 2009/0324159 A1 | 12/2009 | Kopp et al. | |
| 2010/0002983 A1 | 1/2010 | Kopp et al. | |
| 2010/0158438 A1 | 6/2010 | Churikov et al. | |
| 2011/0292676 A1 | 12/2011 | Weiner et al. | |
| 2011/0293219 A1 | 12/2011 | Weiner et al. | |
| 2012/0189241 A1 | 7/2012 | Kopp et al. | |
| 2012/0257857 A1 | 10/2012 | Kopp et al. | |
| 2013/0121641 A1 | 5/2013 | Singer et al. | |
| 2013/0188174 A1 | 7/2013 | Kopp et al. | |
| 2013/0188175 A1 | 7/2013 | Kopp et al. | |
| 2013/0216184 A1 | 8/2013 | Kopp et al. | |
| 2014/0294345 A1 | 10/2014 | Kopp et al. | |
| 2015/0212274 A1 | 7/2015 | Kopp | |
| 2017/0192176 A1 | 7/2017 | Kopp | |
| 2017/0219774 A1 | 8/2017 | Kopp | |
| 2017/0268937 A1 | 9/2017 | Kopp et al. | |
| 2017/0269277 A1 | 9/2017 | Weiner et al. | |
| 2017/0269293 A1 | 9/2017 | Churikov et al. | |
| 2017/0276867 A1 | 9/2017 | Kopp | |
| 2017/0299806 A1 | 10/2017 | Kopp | |
| 2017/0336659 A1 | 11/2017 | Kopp et al. | |

FOREIGN PATENT DOCUMENTS

| | | |
|---|---|---|
| WO | WO 2008/080174 A1 | 7/2008 |
| WO | WO 2017/053479 A1 | 3/2017 |
| WO | WO 2017/100667 A1 | 6/2017 |

* cited by examiner

Multi-mode step index

300a

Multi-mode gradient index

300b

Single-mode multistep index
(at least one step)

300c

400a

Single taper

400b

Dual taper

HIGH DENSITY OPTICAL PACKAGING HEADER APPARATUS

CROSS-REFERENCE TO RELATED APPLICATIONS

The present patent application is a continuation of U.S. application Ser. No. 13/442,175, entitled "High Density Optical Packaging Header Apparatus," filed Apr. 9, 2012, which claims priority benefit from the commonly assigned U.S. provisional patent application Ser. No. 61/433,852, entitled "High Density Optical Packaging Header Apparatus", filed Apr. 8, 2011.

FIELD OF THE INVENTION

The present invention relates generally to couplers and connectors for connecting multiple optical fibers/waveguides to optical-fiber-based electronic systems and components, and more particularly to a versatile optical packaging header apparatus that is readily configurable for use in a variety of applications involving highly flexible and modular connection of multiple optical fibers/waveguides assembled in a header block configuration to optical-fiber-based system/component/device backplanes, while providing advantageous active and passive alignment features.

BACKGROUND OF THE INVENTION

There are many applications in the field of electronic/optical systems, which require simultaneous connection of multiple optical fibers/waveguides to electronic/optical systems, components and devices, with high reliability and flexibility. Such requirements pose significant challenges due at least in part to:
- the necessity of precise passive and active alignment of the connections (which is exacerbated when the connection involves multiple geometrically dispersed fibers/waveguides),
- the inherent fragility of optical fibers/waveguides,
- the need to match wave guidance value of the fibers/waveguides to numerical aperture or mode field diameter of the system/component/device interface, and
- the need to match spatial configuration of the optical fibers/waveguides to the electronic/optical system/component/device backplane.

It would thus be desirable to provide a versatile and modular solution for simultaneously connecting multiple optical fibers/waveguides to electronic/optical systems, components, and devices that addresses the above-noted and other related challenges.

BRIEF DESCRIPTION OF THE DRAWINGS

In the drawings, wherein like reference characters denote corresponding or similar elements throughout the various figures.

SUMMARY OF THE INVENTION

Figure 1A:
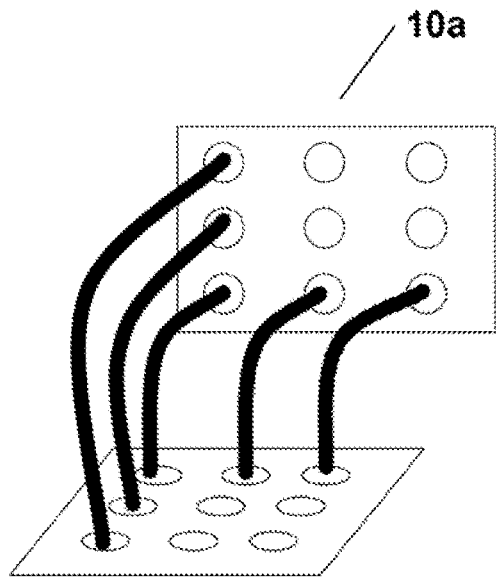
FIGS. 1A, 1B, 2, 3, 4, 5, and 6 show schematic diagrams of isometric views of various exemplary embodiments of the inventive high density optical packaging header (HDOPH) blocks for connection to optical components, each comprising at least one optical fiber waveguide.

The present invention is directed to an inventive high density optical packaging header apparatus that, in various embodiments thereof, provides configurable, modular, and highly versatile solutions for simultaneously connecting multiple optical fibers/waveguides to optical-fiber-based electronic systems, components, and devices, and is readily usable in a variety of applications involving highly flexible and modular connection of multiple optical fibers/waveguides assembled in a header block configuration to optical-fiber-based system/component backplanes, while providing advantageous active and passive alignment features.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE INVENTION

The apparatus of the present invention advantageously overcomes and address the drawbacks of previously known solutions for simultaneously connecting multiple optical fibers/waveguides to optical-fiber-based systems, components, and devices, and provides additional beneficial features.

Specifically, the inventive high density optical packaging header apparatus, in various embodiments thereof, provides configurable, modular, and highly versatile solutions for simultaneously connecting multiple optical fibers/waveguides to optical-fiber-based electronic systems, components, and devices, and is readily usable in a variety of applications involving highly flexible and modular connection of multiple optical fibers/waveguides assembled in a header block configuration to optical-fiber-based system/component backplanes, while providing advantageous active and passive alignment features.

Before describing the various exemplary embodiments of the present invention, the term "wave guidance parameter(s)" of a waveguide as utilized herein, may indicate either (1) numerical aperture(s) thereof, or (2) mode field diameter(s) thereof. It should be noted that a higher wave guidance parameter value of a waveguide region corresponds to a higher numerical aperture value and a lower mode field diameter value in that region and also indicates that the waveguide region is less susceptible to bend loss (in the case when the waveguide is bent). Conversely, a lower wave guidance parameter value of a waveguide region corresponds to a lower numerical aperture value and a higher mode field diameter value in that region and also indicates that the waveguide region is more susceptible to bend loss (in the case when the waveguide is bent).

The apparatus of the present invention, in at least one exemplary embodiment thereof, comprises a set of high density optical packaging header (HDOPH) blocks for connecting optical components (e.g., cards, boards, or equivalents thereof), which assemble and retain a set of optical fibers to optical backplane, either in a straight position (e.g., 180 degrees), or positioned at a predefined angle (e.g., at a right (90 degree) angle). The optical fiber waveguides in these components can be optical fibers, and/or other optical fiber waveguides of differing wave guidance values, and/or having different spatial positions/configurations. In at least some embodiments of the present invention, one or more of the optical fiber waveguides may comprise at least one of optical fiber coupler, such as disclosed in the commonly assigned U.S. Pat. No. 7,308,173 entitled "OPTICAL FIBER COUPLER WITH LOW LOSS AND HIGH COUPLING COEFFICIENT AND METHOD OF FABRICATION THEREOF", which is hereby incorporated by reference herein in its entirety.

One of the key aspects of the present invention is the capability of configuring the optical fiber waveguide components of the novel HDOPH block arrays to comprise specific desirable waveguide parameter value(s) at one or both ends thereof (which may be the same, or which may differ between one or more waveguides in a particular inventive HDOPH block array) with at least a portion of the waveguides being connected to at least one fiber port of at least one optical fiber header block. This is advantageously accomplished for each waveguide by utilizing an optical fiber waveguide having a capacity for at least one optical mode of a predetermined mode field profile, and comprising, along at least a portion of its length, a particular predetermined transverse refractive index distribution and a particular predetermined longitudinal diameter profile, wherein the particular predetermined transverse refractive index distribution and the particular predetermined longitudinal diameter profile are selected and configured to predetermine at least one wave guidance parameter value over at least one region along the optical fiber waveguide for any propagating light signal, launched into the at least one optical mode of the optical fiber waveguide (e.g., from a fiber port connected to one end thereof).

Figure 7A:
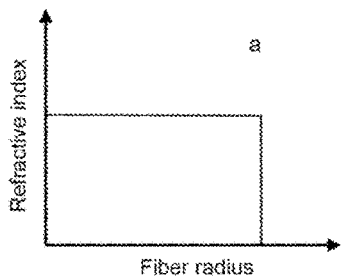
FIGS. 7A, 7B, and 7C show exemplary graphs, each representative of an exemplary embodiment of a different predetermined transverse refractive index distribution for use in configuring least one optical fiber waveguide in each of the various embodiments of the HDOPH blocks of FIGS. 1A to 5.
Figure 7B:
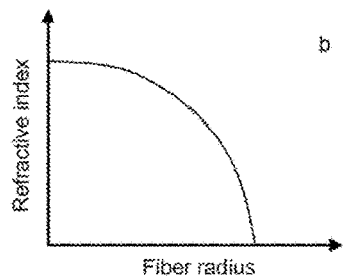
Figure 7C:
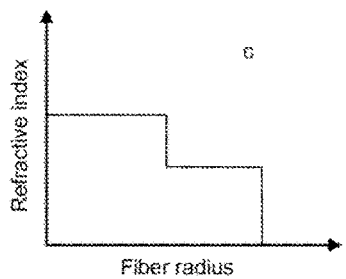

Referring now to FIGS. 7A-7C, various exemplary embodiments of predetermined transverse refractive index distributions that may be selected and configured for one or more optical fiber waveguides in accordance with the present invention, are shown, by way of example only, as a multi-mode step index distribution 300a (FIG. 7A), a multi-mode gradient index distribution 300b (FIG. 7B), and/or a single-mode multi-step index distribution 300c (FIG. 7C). It should be noted that transverse refractive index distributions other that as is shown in FIGS. 7A to 7C may be readily selected as a matter of design choice without departing from the spirit of the invention.

Figure 8A:
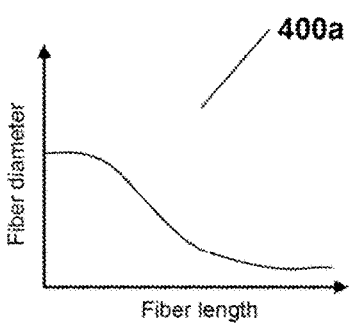
FIGS. 8A and 8B show exemplary graphs, each representative of an exemplary embodiment of a different predetermined longitudinal diameter profile for use in configuring least one optical fiber waveguide in each of the various embodiments of the HDOPH blocks of FIGS. 1A to 5.
Figure 8B:
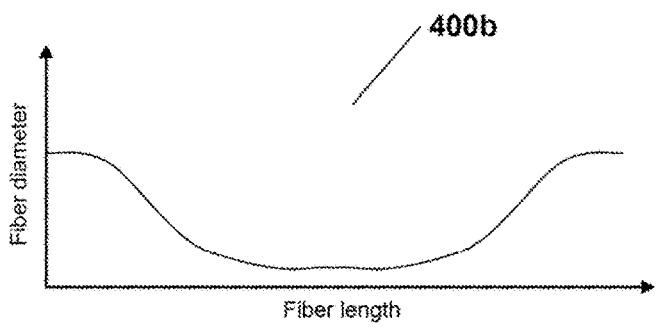

Referring now to FIGS. 8A-8B, various exemplary embodiments of predetermined longitudinal diameter profiles, that may be selected and configured for one or more optical fiber waveguides in accordance with the present invention, are shown, by way of example only, as a single taper diameter profile 400a (FIG. 8A), or as a dual taper diameter profile 400b (FIG. 8B). It should be noted that longitudinal diameter profiles other that as is shown in FIGS. 8A to 8B may be readily selected as a matter of design choice without departing from the spirit of the invention.

It should further be noted that in various exemplary embodiments of the present invention, the predetermined transverse refractive index distribution and the predetermined longitudinal diameter profile, may be selected and configured, for at least one selected optical fiber waveguide in an inventive HDOPH block array such that: (a) the optical fiber waveguide diameter and wave guidance parameter values thereof are correlated, or (b) the optical fiber waveguide diameter and wave guidance parameter values thereof are inversely correlated.

Figure 1B:
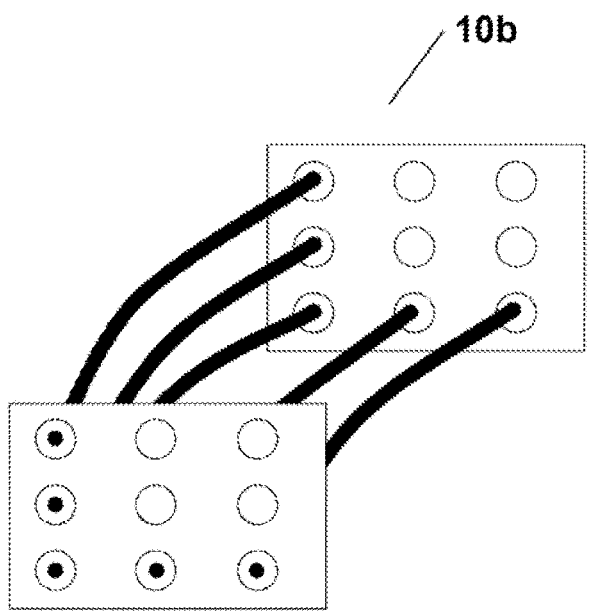

In various inventive embodiments thereof, the novel HDOPH blocks (e.g., and HDOPH block arrays, as may be applicable) may comprise one or more of the following advantageous features/elements:

Referring now to FIGS. 1A-1B, the inventive HDOPH blocks may be constructed of precision made plates with holes (drilled, etched, and/or otherwise formed) that can be glued or fused in perpendicular configurations (such as a HDOPH block array assembly 10a of FIG. 1A), or in parallel configurations (such as a HDOPH block array assembly 10b of FIG. 1B).

Figure 2:
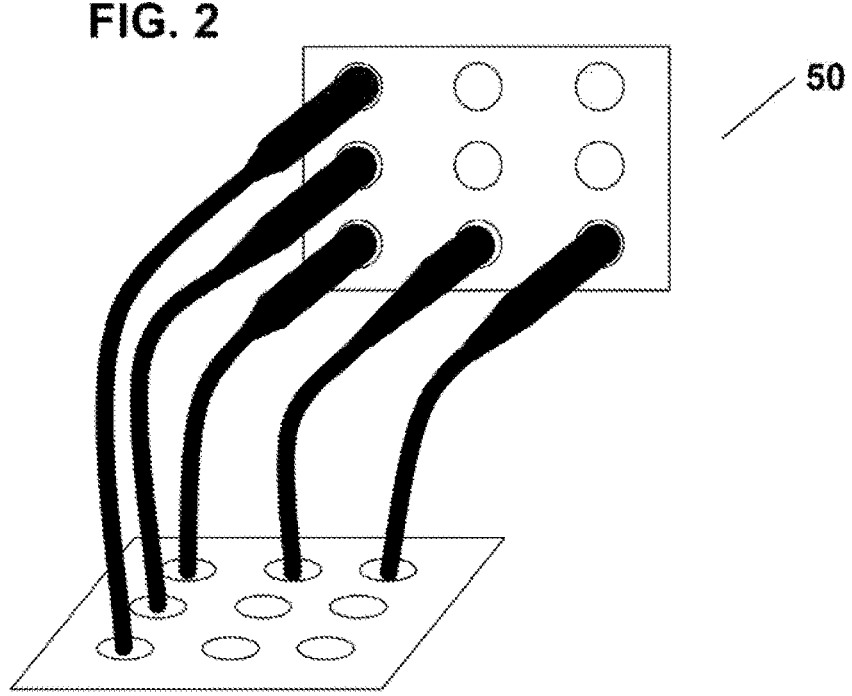
Figure 3:
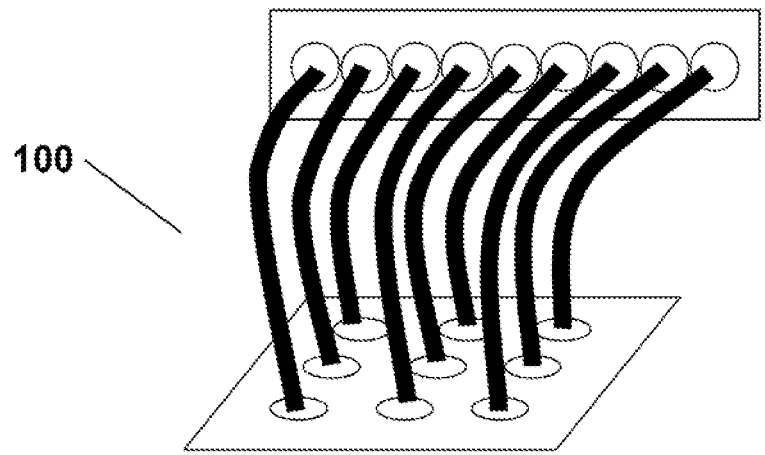

Referring now to FIGS. 2 and 3, the inventive HDOPH blocks may be configured with spot-size converting properties, for example utilizing tapered 3-glass fibers to convert wave guidance values (e.g. in a similar manner to arrayed spot-size converting tapered coupler).

However, in accordance with the present invention, the orientation of the array can be intentionally changed/transitioned as desired. For example, as is shown for an exemplary embodiment of the present invention—a HDOPH block array assembly 100 of FIG. 3—a 1D HDOPH block array may be readily transitioned to a 2D HDOPH block array or a 1D HDOPH block array may be transitioned to another 1D HDOPH block array, but with different fiber spacing.

Figure 4:
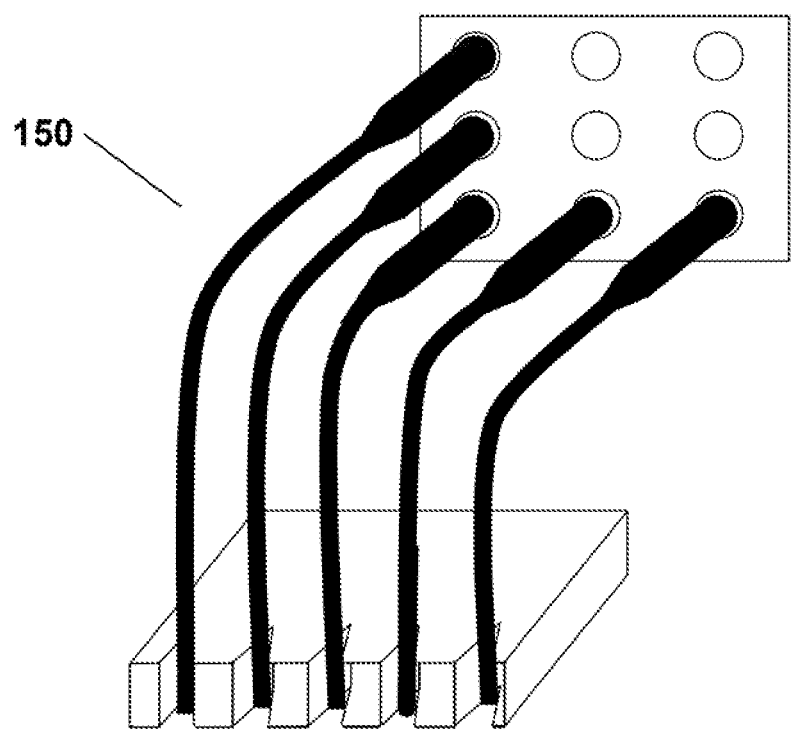
Figure 5:
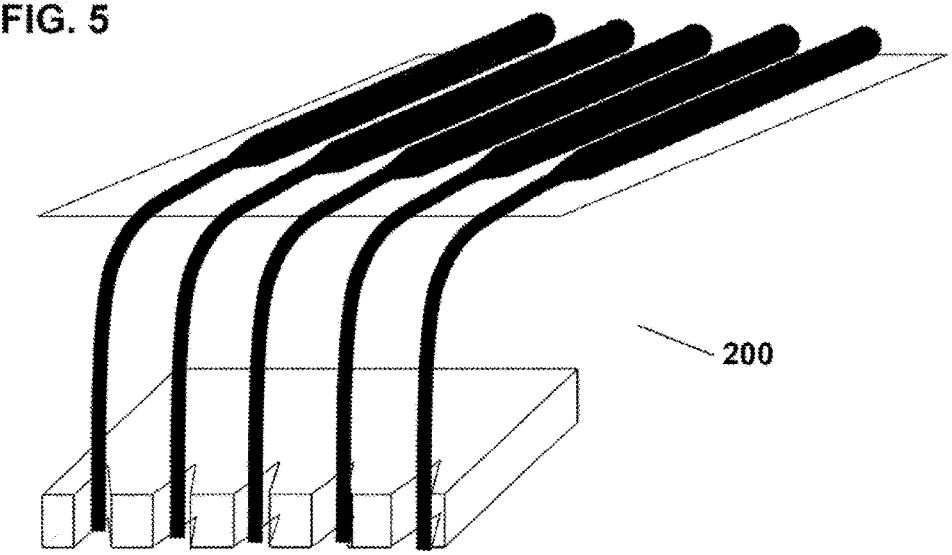

Referring now to FIGS. 4 and 5, the inventive HDOPH blocks can be used as an angled transition (e.g., for a 90 degree angle transition), as is shown for a HDOPH block array assembly 150 of FIG. 4.

For example, HDOPH blocks can use a reduced (e.g., tapered) 3-glass fiber therebetween to achieve a minimal bend radius (essentially, the tapered region between the blocks gives the entire connection system great flexibility, while conventional fibers cannot be bent with an equivalently short bend radius).

Furthermore, the orientation of the HDOPH block array used for an angled transition can be intentionally changed/transitioned as desired. For example, as is shown for an exemplary embodiment of the present invention—a HDOPH block array assembly 200 of FIG. 5—a 1D HDOPH block array may be readily transitioned to a 2D HDOPH block array or a 1D HDOPH block array may be transitioned to another 1D HDOPH block array but with different fiber spacing.

If the waveguide sizes and orientation remain the same for a particular connection configuration, multiple inventive HDOPH blocks may be readily and efficiently produced by guiding multiple fibers through multiple plates simultaneously, and then fusing and polishing waveguides (i.e., through a single fiber insertion step).

Inventive HDOPH blocks may be configured as being connected permanently to backplane or plug-in cards.

Optical components can be injection molded with, for example, spring wires, zirconia sleeves, or equivalents, for coupling to optical waveguides or fibers, respectively.

Inventive HDOPH blocks may be configured with a plurality of channels (holes), some of which may be utilized for receiving and retaining optical fibers, while others may be left empty for use with passive alignment elements, thus enabling fabrication of a passive alignment—enabled optical fiber connection system in a single process step.

Figure 6:
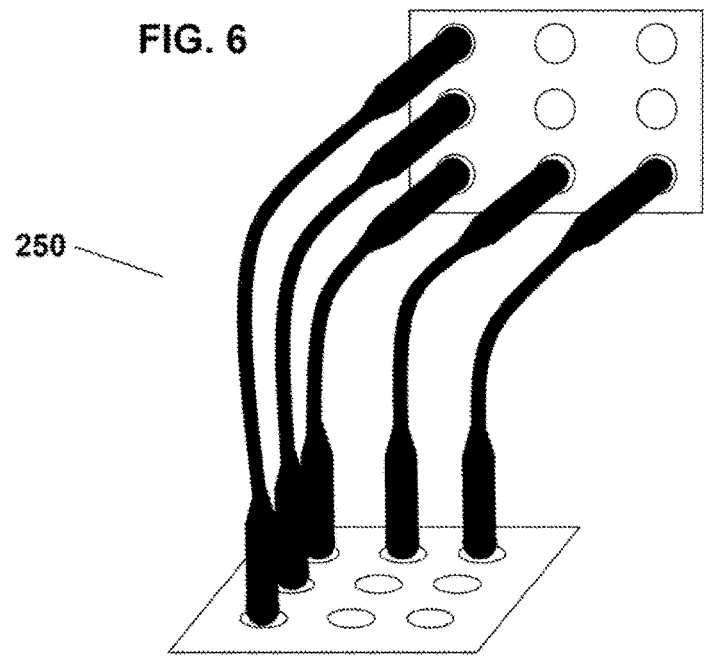

The inventive HDOPH blocks may be configured with one wave guidance parameter value at one end and the same or other wave guidance parameter value at the other end, as is shown, by way of example for a HDOPH block array assembly 250 of FIG. 6.

The fiber ports of various embodiments of the inventive HDOPH blocks may comprise holes and/or V-grooves (as shown in FIGS. 4 and 5).

Thus, while there have been shown and described and pointed out fundamental novel features of the inventive apparatus as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An optical fiber array assembly for use with a multi-channel optical waveguide device, comprising:
   at least one optical fiber header block, having a plurality of fiber ports, and
   a plurality of separate individual optical fiber waveguides each having a capacity for at least one optical mode of a predetermined mode field profile, wherein at least one end of each said plural optical fiber waveguide is attached to a corresponding plural fiber port, wherein each said plural optical fiber waveguide comprises a particular predetermined transverse refractive index distribution and a particular predetermined longitudinal diameter profile, and wherein each particular predetermined transverse refractive index distribution and each particular predetermined longitudinal diameter profile along said optical fiber waveguide, are selected and configured to predetermine at least one of a plurality of wave guidance parameter values at a plurality of locations along said plural optical fiber waveguide for any propagating light signal, launched from each said plural fiber port into said at least one optical mode of said corresponding plural optical fiber waveguide, and wherein said predetermined transverse refractive index distribution and said predetermined longitudinal diameter profile are selected and configured, for at least one selected plural optical fiber waveguide, such that diameter and wave guidance parameter values thereof are inversely-correlated.

2. The optical fiber array assembly of claim 1, wherein said wave guidance parameter values are for a wave guidance parameter selected from one of: numerical aperture, and mode field diameter.

3. The optical fiber array assembly of claim 1, wherein at least one of said plural fiber ports comprises a hole.

4. The optical fiber array assembly of claim 1, wherein at least one of said plural fiber ports comprises a V-groove.

5. The optical fiber array assembly of claim 1, wherein at least one of said plural optical fiber waveguides is substantially straight in a region along its length corresponding to a first wave guidance parameter value, and is substantially bent in a region along its length corresponding to a higher wave guidance parameter.

6. The optical fiber array assembly of claim 1, wherein each said plural optical fiber waveguide is attached to said plural fiber ports of said optical fiber header blocks at both ends thereof.

7. The optical fiber array assembly of claim 1, further comprising:
   a substrate, oriented at a predefined angle with respect to said plural fiber ports of said optical fiber header block, sized and configured to support said plural optical fiber waveguides.

8. The optical fiber array assembly of claim 7, wherein said predefined angle comprises 90 degrees.

9. An optical fiber array assembly for use with a multi-channel optical waveguide device, comprising:
   at least one optical fiber header block, having at least one fiber port, and
   an optical fiber waveguide having a capacity for at least one optical mode of a predetermined mode field profile, wherein at least one end of said optical fiber waveguide is attached to a corresponding at least one fiber port, wherein said optical fiber waveguide comprises a particular predetermined transverse refractive index distribution and a particular predetermined longitudinal diameter profile, and wherein said particular predetermined transverse refractive index distribution and said particular predetermined longitudinal diameter profile along said optical fiber waveguide, are selected and configured to predetermine at least one of a plurality of wave guidance parameter values at a plurality of locations along said optical fiber waveguide for any propagating light signal, launched from said at least one fiber port into said at least one optical mode of said optical fiber waveguide, and wherein said predetermined transverse refractive index distribution and said predetermined longitudinal diameter profile are selected and configured, for said optical fiber waveguide, such that diameter and wave guidance parameter values thereof are inversely-correlated.

10. The optical fiber array assembly of claim 9, wherein said wave guidance parameter values are for a wave guidance parameter selected from one of: numerical aperture, and mode field diameter.

* * * * *